United States Patent [19]

Carstensen

[11] Patent Number: 5,584,512
[45] Date of Patent: Dec. 17, 1996

[54] TUBING INTERCONNECTION SYSTEM WITH DIFFERENT SIZE SNAP RING GROOVES

[76] Inventor: Kenneth J. Carstensen, 1860 Whiteoak Dr., Apt. 211, Houston, Tex. 77009

[21] Appl. No.: 132,803

[22] Filed: Oct. 7, 1993

[51] Int. Cl.⁶ ..................................................... F16L 9/14
[52] U.S. Cl. .............................. 285/55; 285/321; 285/351; 285/369; 285/915
[58] Field of Search ...................................... 285/305, 321, 285/55, 334.3, 369, 915, 351; 403/326, 327

[56] References Cited

U.S. PATENT DOCUMENTS

| | | | |
|---|---|---|---|
| 738,503 | 9/1903 | Waters | 285/321 |
| 2,369,770 | 2/1945 | Baxter . | |
| 2,785,910 | 3/1957 | Munger | 285/305 X |
| 3,241,864 | 3/1966 | Shaffer . | |
| 3,339,832 | 9/1967 | Duecker . | |
| 3,584,313 | 6/1971 | Brown et al. | 285/321 X |
| 4,050,722 | 9/1977 | Berger et al. | 285/321 X |
| 4,243,254 | 1/1981 | Hill et al. . | |
| 4,278,276 | 7/1981 | Ekman | 285/321 X |
| 4,280,719 | 7/1981 | Daniel et al. . | |
| 4,519,638 | 5/1985 | Yodoshi et al. | 285/305 |
| 4,638,838 | 1/1987 | Richard et al. . | |
| 4,768,616 | 9/1988 | Richard et al. . | |
| 4,804,206 | 2/1989 | Wood et al. | 285/321 X |
| 5,020,591 | 6/1991 | Shore . | |
| 5,129,389 | 7/1992 | Tauscher et al. . | |
| 5,131,785 | 7/1992 | Shimazaki | 285/321 X |
| 5,320,388 | 6/1994 | Lacy et al. | 285/55 |

FOREIGN PATENT DOCUMENTS

| | | | |
|---|---|---|---|
| 695250 | 9/1964 | Canada | 285/321 |
| 433870 | 10/1967 | Switzerland | 285/321 |
| 1097192 | 12/1967 | United Kingdom | 285/305 |
| 1230857 | 5/1971 | United Kingdom | 285/305 |

Primary Examiner—Dave W. Arola
Attorney, Agent, or Firm—Merchant, Gould, Smith, Edell, Welter & Schmidt

[57] ABSTRACT

An interconnection system for pipelines and other oil country applications enables the parent metal of internally coated or lined pipe to be free of thermal and mechanical stresses that degrade the coatings or linings. A male member having an internal lining and a female member into which the male member is to be fitted each have internal circumferential grooves into which open loop snap rings are locked. By arranging grooves and snap rings of progressively changing axial lengths, a number of rings are deployed in a given installation, since rings preinstalled in the female member pass over smaller grooves in an inserted male member until all contrast into position at the same time. In a pin and box combination, the nose ends of the pins compress a central seal ring that is internally flush with the pin linings. The central seal and O-rings seated in the box and engaging the pins block passage of internal presurgical gases and corrosive materials. The interconnection system also is useful with unlined and uncoated pipe systems wherein there is a benefit in reducing the equipment, time or costs involved in pipeline installation.

23 Claims, 9 Drawing Sheets

TUBING INTERCONNECTION SYSTEM WITH DIFFERENT SIZE SNAP RING GROOVES

BACKGROUND OF THE INVENTION

This invention relates to systems and methods for fluid transport, as well as to oil country tubular goods for pipeline and downhole applications. More particularly, it relates to easily assembled tubular systems and methods for transport of fluids, such as oil, gas, potable water, slurries and the like, in which tubing sections are permanently interconnected in such manner as to have both interior sealing and adequate tensile strength for each given application.

Oil and gas pipelines, as typical examples of fluid transport lines, are usually interconnected by coupling individual sections together in end-to-end relation, often by welding and sometimes by end sections which mate together, with or without internal seals, and usually with threaded connections. Because the fluids being transported may be corrosive, at high temperature or high pressure, it is also common to use internal coatings or linings in the pipe. The internal coating or lining must have special characteristics, and therefore is typically expensive, but even so, the lining is often not free of defects or potential defects. Where the parent metal is thermally stressed, as by welding, the heat affected regions can immediately or latently develop defects, known as holidays. Similarly, where the parent metal is highly mechanically stressed, as by the radial interferences required for threaded pipe, immediate or latent cracking in the coating or lining can also occur at the stress zones. Thus the industry has emphasized the need for "holiday free" internally coated pipe connections. In recognition of the problems involved in attaining this goal, numerous techniques have been devised for repairing pipes and overcoming the damage done to coatings by the welding process.

Because pipelines are usually disposed horizontally, above ground or underground, they are not highly tensioned by a suspended mass. Thus, where high stresses exist they are typically the consequence of high internal pressures and thermal expansion and contraction coefficients. No loads of consequence are imposed axially on the couplings.

In downhole installations, however, substantial tensile stresses are applied in accordance with the length of the string and weight of the pipe, so threaded couplings are used where strings are to be assembled and disassembled. Where tubular goods are to be permanently installed, however, as in downhole installations in which pipe strings of limited length are encased in cement, then different interconnection systems, including those in accordance with the invention, become feasible. Here the requirements remain for easy assembly, maintaining the integrity of the coating or lining, and maintaining seals against high internal pressures and corrosive, high temperature gases or fluids. In addition, however, the assembly must withstand the mechanical tensile loads that are imposed. Where these requirements can be met, however, there are particular advantages to be derived from an ability to make connections quickly, because of the high costs of drilling rigs and drilling crews.

SUMMARY OF THE INVENTION

A connection system for fluid transporting lines comprises a unidirectional connection structure in which an outer or female member, such as a collar, and an inner or male member, such as a tube or pin, each include at least one matching pair of internal snap ring grooves. Expandable snap rings are inserted in the grooves in such manner as to lock the tubular ends together when the male member is inserted to a predetermined depth in the female member.

In the overlap region of the male and female members to be coupled together, facing grooves are disposed that have like axial lengths selected to accept matching open lock snap rings initially held in the female member. Each snap ring expands into an adequate depth of groove in the female member to accommodate the outer diameter of the received male member, but snaps into place when the matching groove in the male member is reached. The radial dimension of the snap rings spans the walls of both grooves to provide a high shear strength locking element. A number of snap rings may be used by disposing a number of grooves and mating snap rings of progressively increasing axial length in the overlap region. The smaller grooves pass the larger snap rings first, until a position is reached at which all the rings snap into place simultaneously. At this point, the relative positions of the two elements are precisely determined and permanently fixed.

The snap rings are open loop, high strength helical segments that can be concentrically aligned in the grooves in the collar and expand over the outer surface of the pin being inserted until they lock into position at the appropriate groove. Circumferential O-rings are also disposed between the mating members to improve sealing properties. This arrangement facilitates high speed end-to-end assembly of tubular goods, with the strength of the snap ring connection being such that failure occurs in the wall of the tubing rather than within the rings. Because the parent metal of the male and female members is not mechanically or thermally stressed, deformation of the elements is eliminated and internal coatings or linings remain holiday-free.

Further in accordance with the invention, the outer member may be a coupling collar having a central region and two or more different size snap ring grooves containing matching rings on each side of the central region. The size progression of the snap rings decreases from the end toward the center on each side of the collar. The tubular pins have chamfered leading edges for insertion into the collar and through the snap rings, which expand radially with a camming action on the chamfer and then slide on the outer diameter of the pin until they seat in the appropriate grooves. Between the pins is positioned an elastomeric, corrosion resistant central seal ring contoured to mate with the chamfered surfaces and nose ends of the pins. The seal ring is compressed between the pins and also has an inner diameter that is flush with the interior diameter of the facing pins so that there is no discontinuity along the flow path.

In a more specific example in accordance with the invention, for assembling a pipeline, the collar as well as each pipe end has a pair of circumferential grooves of different sizes, matching the grooves adjacent the central region of the collar. Helical, open loop snap rings are matingly fitted into and centered within the grooves within the collar prior to assembly. A first pin is inserted with a sliding fit into one side of the collar at the pipe mill or assembly facility. The snap rings engage into position in the pin grooves at a precise axial relation to the centrally positioned seal ring, which is of a high temperature corrosion resistant polymer. The central seal ring incorporates end skirts fitting between recessed shoulders on the outer diameters of the pins, and also angled corners engaging the chamfers on the side of the pin nose ends. In the field, during assembly of the pipeline string, the end of a second pin having snap rings disposed in mirror image relation to these in the first pin is inserted into the collar under adequate axial force to a position in which the snap rings engage and the central seal ring is compressed to a desired extent, this being accomplished by a hydraulic or pneumatic ram mechanism. Prior to insertion of the pins in the collar, an anaerobic adhesive may be coated on the pin exterior, to cure rapidly after the connection is made. The adhesive serves both to augment the seal and to prevent rotation of the pin relative to the collar.

In accordance with the invention, the expandable open loop snap rings are typically undersized in the axial direction relative to the grooves in which they are fitted, but are also helical in shape. Once inserted into a groove, they engage both side walls at different circumferential points and maintain a radially aligned position first achieved by insertion of a centering tool before the connection is made. The depth of the grooves in the pin can be chosen so that failure occurs at a predetermined region, such as the first groove in the pin. The rings themselves are of high strength steel and readily resist the shear stresses imposed on them.

Further in accordance with the invention, the snap rings are not only preinstalled and centered, as previously described, but a hydraulic or pneumatic clamping and driving system is utilized to verify both that the male connection has been correctly made, and to insert the field end pipe to the desired degree of compression relative to the central seal ring.

As will be evident to those skilled in the art, interconnection systems and methods in accordance with the invention can be used with a wide range of pipe diameters, typically from the two-inch to the 20-inch range, principally in pipeline installations but also in permanent downhole installations of limited length. The system is also applicable to configurations utilizing upset pipe lengths interconnected with or without intervening members. Where higher stresses or pressures, or both, are to be encountered, and higher forces are to be exerted, as with larger size pipe, the number of seal rings can be increased, together with the number of O-rings.

BRIEF DESCRIPTION OF THE DRAWINGS

A better understanding of the invention may be had by reference to the following description, taken in conjunction with the accompanying drawings, in which.

DETAILED DESCRIPTION OF THE INVENTION

Figure 1:
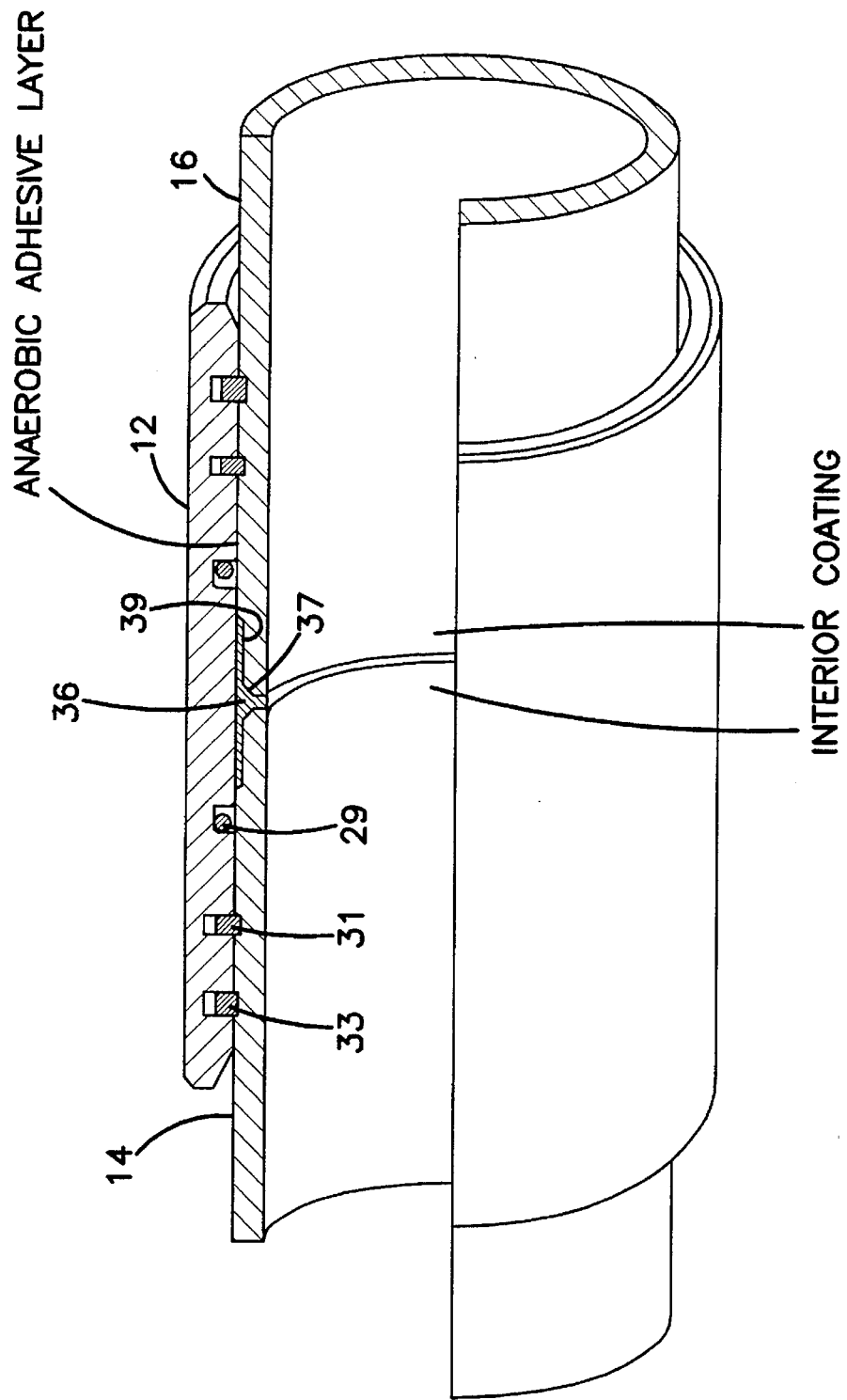
FIG. 1 is a perspective view, partially broken away, of a portion of a pipe connection system in accordance with the invention including pins and a collar.
Figure 2:
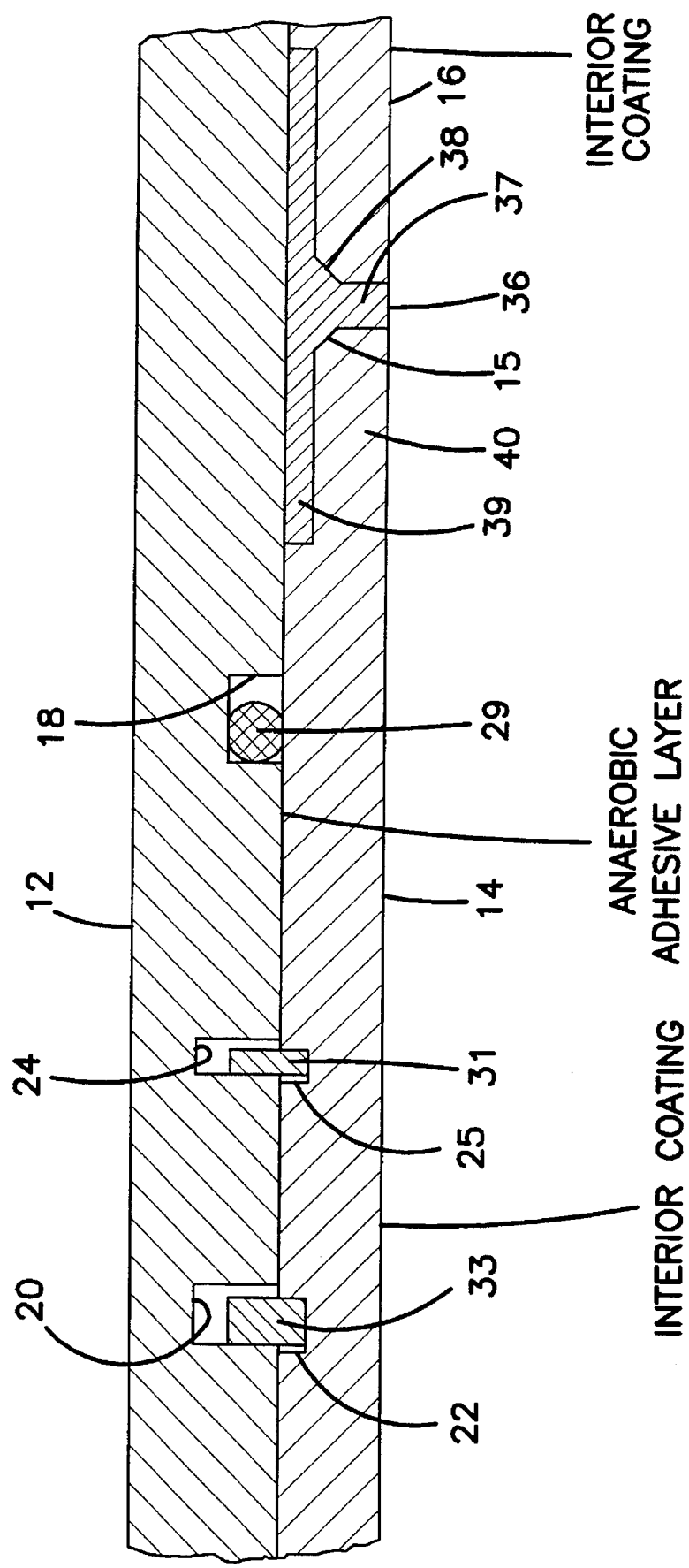
FIG. 2 is an enlarged cross-sectional view of a part of the system of FIG. 1.

Referring now FIGS. 1–2, a pipe connection system 10 in accordance with the invention utilizes an outer coupling or collar 12, here illustrated as it is employed with a nominal 2⅜" pipe. In the present example, the collar 12 has an inner diameter of 2.365" +0.001"/–0.000", and it is symmetrical about its center. A first pin, 14, arbitrarily referred to as the mill end pin, fits within the collar 12, the first pin 14 having a 2.363" +0.000"/–0.001" outer diameter. Consequently, the gap between the inner radius of the collar 12 and the outer radius of the pin 14 can vary, at the tolerance extremes, only up to 0.002," to give a close sliding fit without excessive looseness in the coupling. The total length of the collar 12, in this example, is 4.000", so that, with due allowance for a central seal, the length of engagement of the pin 14 in the collar 12 is of the order of 1.938". The first pin 14 has a flat nose end with a side angle or chamfer 15. The second pin 16 is similarly dimensioned and configured relative to the first pin 12 and the collar has a mirror image arrangement of grooves to be described below. Although the arrangement need not be symmetrical, for practical reasons of economy of inventory, interchangeability and simplicity, the system usually employs mirror image groove and seal ring geometries.

Figure 3:
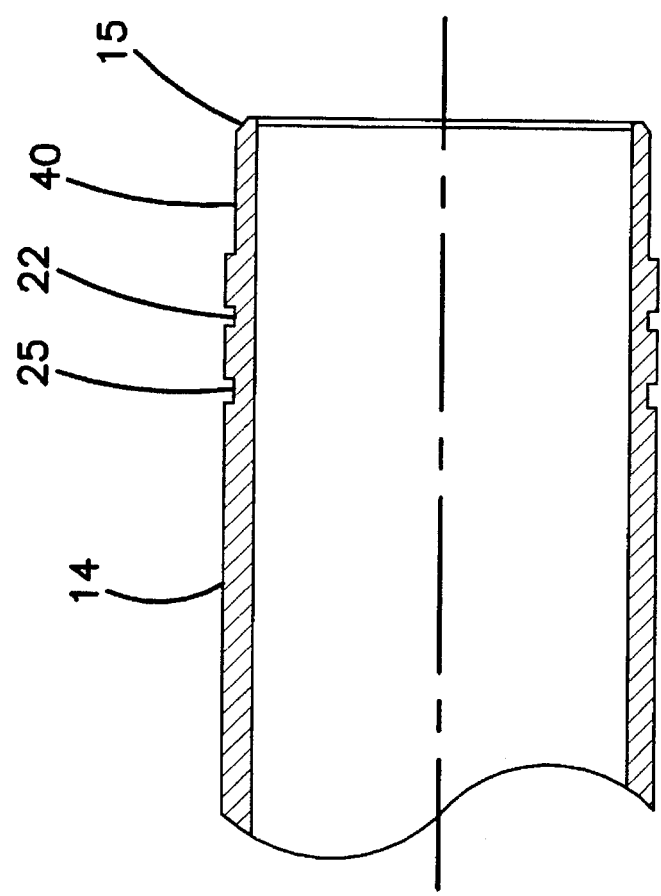
FIG. 3 is a side sectional view of a portion of a pin used In the system of FIGS. 1 and 2.
Figure 4:
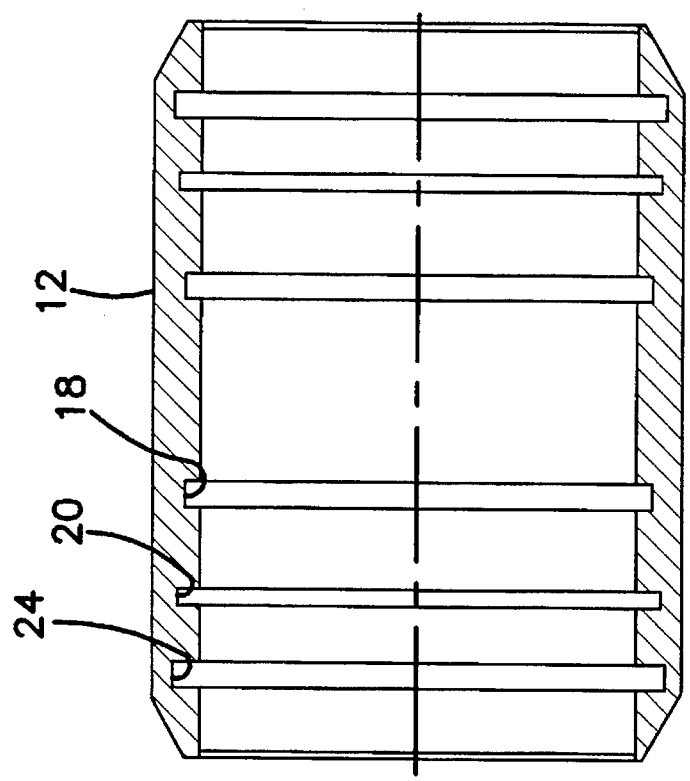
FIG. 4 is a side sectional view of a collar used in the system of FIGS. 1 and 2.

In the collar 12, seen also in FIG. 3, circumferential internal grooves are provided between the central region and each of the ends, and because these are symmetrical only one set will be described. Closest to the central region is a groove 18 for an O-ring, this groove 18 being 0.140"+0.005"/–0.000" long in this example. The O-ring groove 18 is placed with its outer edge at 1.386" from the collar 12 end. Proceeding in the direction toward the adjacent collar 12 end, the next groove is a ring groove 20 for the smaller of two snap rings, this groove being 0.104" long with a groove root diameter of 2.677" ±0.002," and placed with its outer edge at 0.827" from the collar edge. At the first pin 14, seen also in FIG. 3, the opposed groove 22 is closest to the pin end, at a spacing of 1.017" from the end, and has like length dimensions and tolerances, but a depth of 0.038" +0.001"/–0.000". A second circumferential ring groove 24 in the collar 12 closest to the collar end has an axial length of 0.135" +0.002"/–0.000," the diameter of the groove root being 2.677" +0.002"/–0.000" and the groove 24 being placed with its outer edge at 0.438" ±0.001" from the end of the collar 12. The opposing groove 25 in the pin 14 has its outer edge at 1.424" from the pin end, and has a length dimension corresponding to the groove 24 and a depth of 0.051".

The depth of penetration of the male pin 14 into the female collar 12 is precisely determined by the groove positions so that the nose end of the pin 14 has a known location relative to the center of the collar 12. Axial stresses on the connection 10 do not affect the seal that is established in the central region due to this precision.

Figure 6:
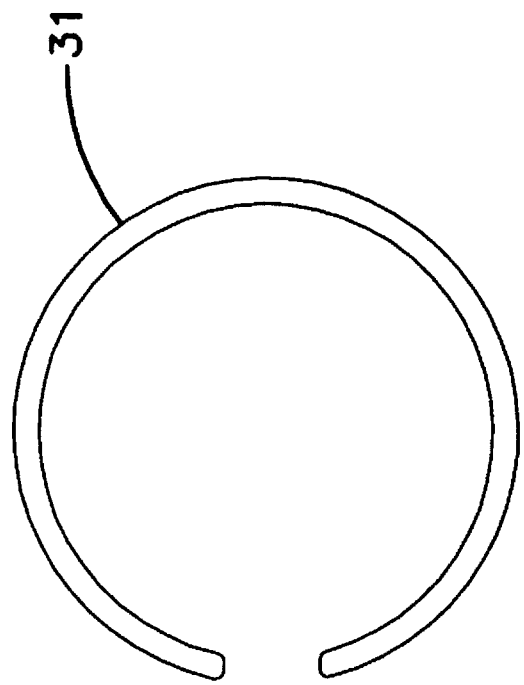
FIG. 6 is an end view of the snap ring of FIG. 5.
Figure 5:
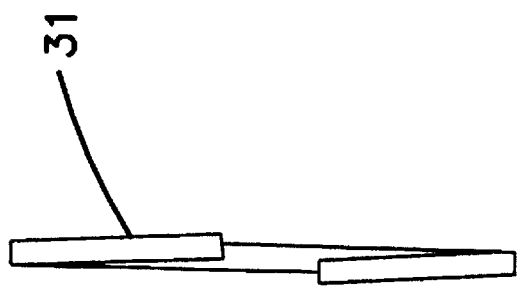
FIG. 5 is a side view of an open loop snap ring that may be employed in the arrangement of FIGS. 1 and 2.

O-rings 29 in the O-ring grooves 18 are sized to seat with a firm engagement about the outer diameters of the respective inserted pins 14 and 16. In this example the O-rings 29 are of "VITON" material. Referring now additionally to FIGS. 5 and 6, an open loop snap ring 31 is shown, representing the smaller of the two snap rings, and having a gap of 0.492" between its opposed ends. The snap ring 31 follows a helical path when unstressed as seen in the side view of FIG. 5, so that it presses against both side walls of the groove into which it seats. The inner diameter of the unstressed shorter snap ring 31 is 2.287" +0.002"/−0.005", giving it the same nominal dimension as the diameters of the groove roots in the pins 14, 16. The radial thickness is 0.120"+0.000"/−0.005." The helical configuration, radial dimension, and diameter are the same for the larger ring seal 33, the major difference being that the axial length of the smaller ring seal 31 is 0.0937" ±0.0015", and 0.125" +0.002"/−0.000" for the larger ring seal 33.

The axial lengths and the depth of the grooves, together with the dimensions and helical shape of the snap rings, function together so that the system can be readily assembled. The ring and groove dimensions are increased for larger size pipes in order to provide chosen shear characteristics in relation to pipe tensile properties. The snap rings when mounted in the female member hold their axial position but can be moved radially for centration relative to the longitudinal axis of the female member. Then as the chamfered end of a male member cams the ring outwardly, the groove in the female member is diametrically large enough to accommodate the outer periphery of the ring until it contracts into the opposite groove. The radial and length dimensions of the snap ring cross-section are selected to provide higher yield strength in the ring than the male and female members, given the use of a spring steel in the ring. Dependent on the specific requirements, a spring steel having a yield strength in the range of 120,000 to 180,000 psi is typically employed. When the rings are positioned and the connection is complete, a small amount of axial shifting can occur when the connection is axially tensional, but the movement is limited by the helical pitch. In order for the rings to share the stresses, the pitches of the rings in relations to the groove axial lengths are selected to be the same.

The enlarged view of FIG. 2 depicts how the sizing and shape of the snap rings 31, 33, in relation to the grooves 20, 24 in the collar 12 and the grooves 22, 25 in the pins 14, 16, determine in-place positioning and locking of the components. The helical snap ring shape biases the pins inwardly toward the center of the female member when there is no load. When tensile stress exists, the snap ring reacts against the force, but only within its range of compliance. However, tensile stress only can draw the pins out a very limited amount, determined by the slight axial clearance, which is not so great that the center seal ring becomes decompressed. Under such axial force the snap rings 31, 33 are flattened and, because they are of high strength steel, resist shear failure.

Figure 7:
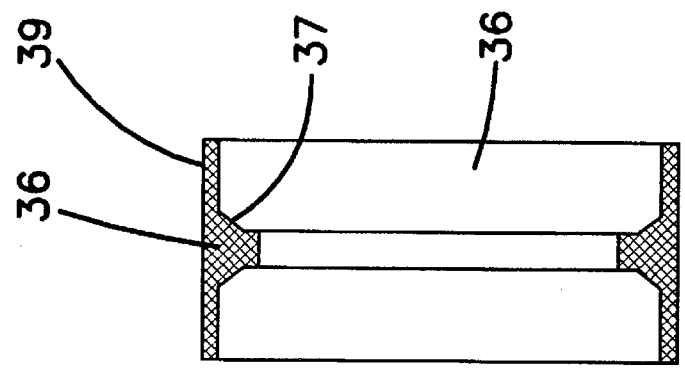
FIG. 7 is a side sectional view of a central seal ring that maybe employed in the system of FIGS. 1 and 2.
Figure 8:
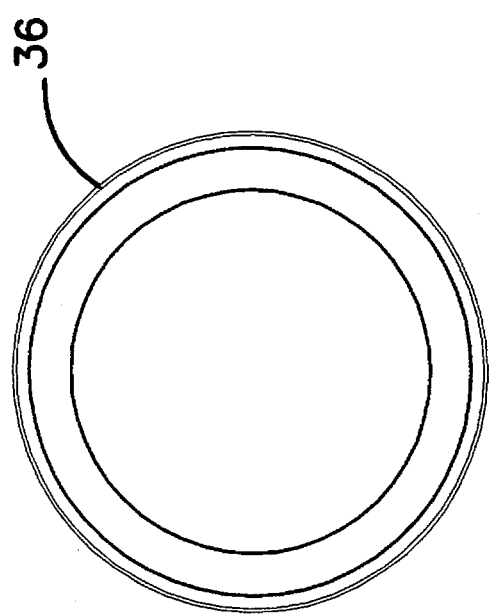
FIG. 8 is an end view of the seal ring of FIG. 7.

Within the connection 10, the center seal ring 36 (best seen in FIGS. 7 and 8) has a center body 37 with slanted corner walls 38 which mate with and engage against the side chamfer 15 adjacent the nose end of the associated pin 14 or 16. The center seal ring 36 is of an axial length between the opposing force of the center body 37 such that it is held under compression between the nose ends of the fully inserted pins 14, 16. Skirts 39 extending axially in both directions from the seal ring 36 insert themselves between the inner wall of the collar 12 and the outer diameter of a reduced diameter end section 40 on the pin 14 (FIG. 3). The inner diameter of the center seal ring 36 is flush with the inner diameter of the pins 14, 16. The center seal ring 36 is of one of the commonly used materials, for these applications, such as "TEFLON" (which is preferred here) "PEEK", or "POLYTHENE". The center seal ring 36 design provides a canning action when engaged by the nose ends of the opposing pins, thereby compressing to maintain both a flush interior surface and sealing conditions when under load.

This arrangement has a number of significant advantages, particularly for coated and lined pipe. Permanent connections can be made faster and more economically than by previously known techniques. Welding of connections, which alters or changes the parent metal and the also degrades coating or linings, is not needed. Also, systems in accordance with the invention eliminate the cracking of coatings and linings due to pin end deformation, because the parent metal remains mechanically unstressed. The connection presents an internal flush bore, with a compressed seal that is highly leak resistant. Simple changes of dimension of the center seal rings are sufficient to accommodate all internal coatings and linings that are currently in use. The O-ring sealing properties add a fail safe factor to the characteristics that are achieved by the center seal ring 36, the close fit of collar and pins, and the metal to metal contact between the snap rings and the surfaces which they engage. Metal-to-metal engagements do not assure a high pressure seal, but augment the seal characteristics already achieved.

In testing this system, under various conditions, the following results were achieved:

TEST A

Tensile Test—Two samples were tested to the limit, and withstood loads of 59,800 pounds and 58,600 pounds respectively. Failure occurred at the first groove in the pin end.

TEST B

Internal Pressure Test—In a water burst test, a pressure of 11,400 PSI was supplied without prior indications of leakage at any time as pressure was built up. This gave a total tension of 38,254 pounds, a percent tensile yield of 121% and an internal yield pressure of 209% before failure occurred. The failure occurred outside the coupling region of the pipe.

TEST C

Nitrogen Gas Pressure Test, with Ambient Temperature and Water Bath—The internal pressure was increased in seven steps from 103 PSI to 6000 PSI, with pressure at 6000 PSI being held for 1465 minutes. The total test time was almost four complete days, but there was no indication of leakage at any time during the test.

TEST D

Pressure Cycling Test—In a pressure cycling test, internal pressures were applied at 125, 250, 500, 1000 and 2000 PSI. At each level the pressure was held from five to fifteen minutes and then released back to 0 pressure before again being cycled. This test was performed using nitrogen gas at ambient temperature, with the samples being submerged in a water bath for leakage indications. There were no indications of leakage at any time during the test.

The snap rings 31, 33 are of 120,000 PSI carbon steel, and by calculation of the maximum stress at the inner surface, taking a Young's modulus of 30 million PSI, it can be shown that the maximum stress at that point is 78,390 PSI. In designing these connections, the stress on the ring is to be considered in relation to the bearing area of the ring relative the pipe body. The net tensile area of the pipe is reduced if the ring bearing area is increased, but as previously indicated, the total safety factor can be well above that desired for any particular installation, given the variations in the wall of the pipe.

Methods in accordance with the invention for the assembling a system such as shown in FIGS. 1 and 2 begin with placement of the center seal ring in position. This positioning need not be precise as long as it is toward the mill end side of the collar, since the mill end pin will move it into position when inserted. Then the snap rings are placed in the collar, which can be done manually without affecting the inner surface of the collar as long as the snap rings have deburred edges. Before or after the snap rings are placed in position, the O-rings are inserted in the O-ring grooves. Then the snap rings are centered, at least on the mill end side, at this time. Since the tubular goods will be handled after initial assembly of the collar and mill end pipe, it is usually preferred to perform the centering action at the other end of the collar immediately prior to installation of the field end pipe. End protectors for the box and pin may be employed in conventional fashion during storage and until assembly.

Figure 9:
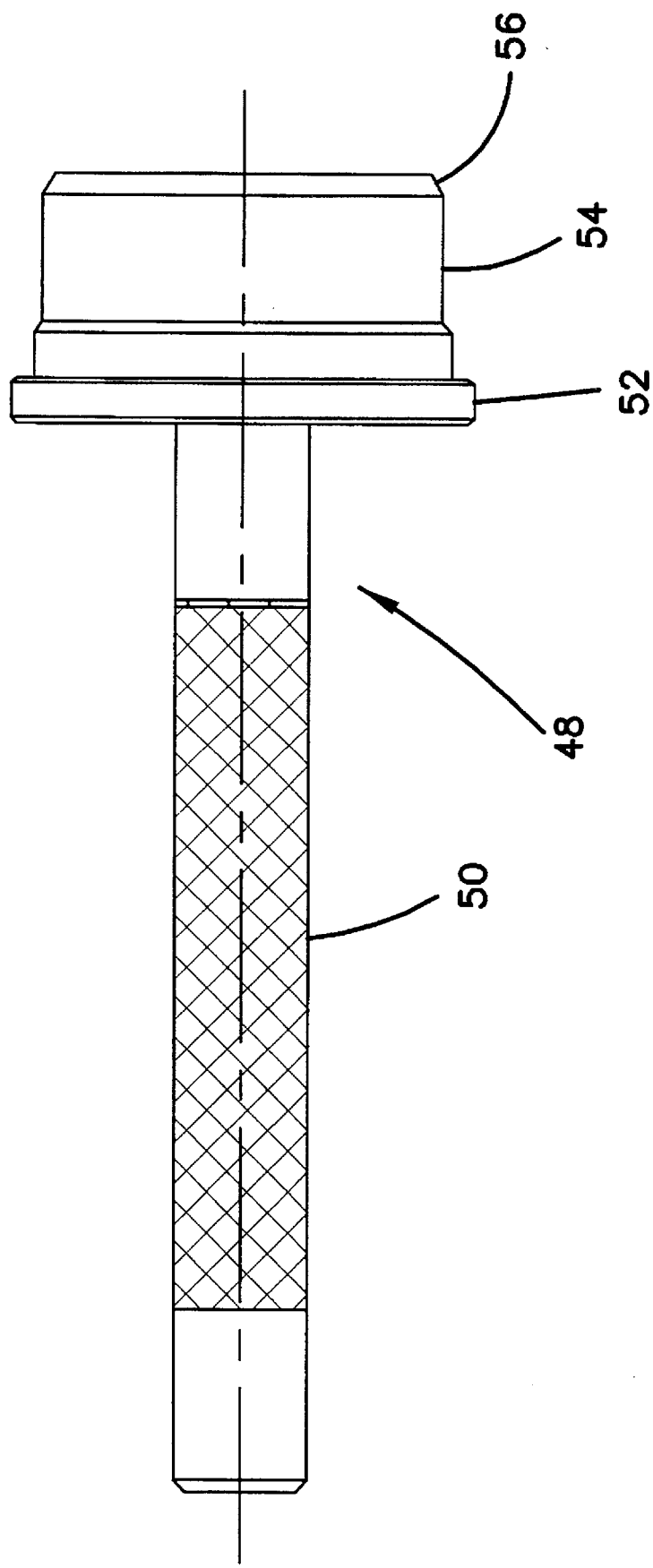
FIG. 9 is a side view of a centering tool that may be used in methods in accordance with the invention.

For purposes of centering, a tool 48 such as shown in FIG. 9 is employed, this having a handle 50 long enough to extend the needed depth collar into the collar. The working end of the tool 48 includes a disc 52 transverse to the central axis of the handle 50 and having an outer diameter matching the inner diameter of the collar with a sliding fit. The forward end of the tool 48 comprises a centering cylinder 54 having an outer diameter matching the ring seal diameter, and a chamfered side surface 56 at the nose end. When the centering tool 48 is inserted in a collar, the chamfered surface 56 enters within eccentrically positioned snap rings, which are then expanded and thereafter automatically radially centered by the centering cylinder 54. The cylinder 54 is long enough to span the number of snap rings used in a particular configuration.

With the snap rings having been centered, the mill end pin is then inserted, with the longer snap rings moving across the smaller groove or grooves in the pin without catching. The snap rings expand outwardly within the diameters of the grooves in the collar, when fitting over the outer surface of the pin. When the pin reaches the predetermined position, the expanded snap ring seals snap into place, engaging the groove roots in the pin and, if the center seal has not been precisely located, forcing the center seal into position. Prior to the insertion, the mill end pin is covered, at least in its central region, with an anaerobic adhesive which effectively joins the pin to the collar, aids in the sealing action, and prevents rotation between the two elements.

Loading of the second or field end pin requires greater force due to the need to effect an initial compression on the center seal material and final checking, and for this a somewhat different procedure is used. The field end pin is inserted into position within the collar with substantial force being needed to precompress the center seal ring. Thereafter, force is reversed, tending to put a tensile load on the connection, thus verifying also that the rings are in place. The field end pin is also coated with an anaerobic adhesive prior to the connection being made.

Figure 11:
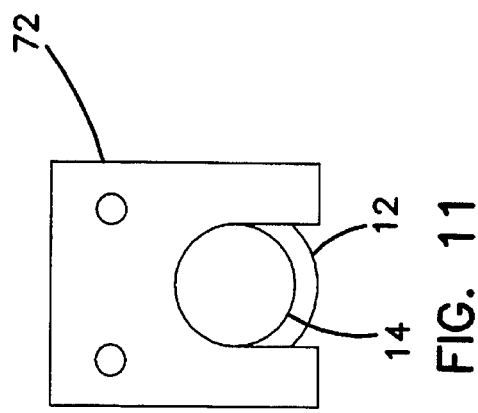
FIG. 11 is an end sectional view of the coupling system of FIG. 10.
Figure 10:
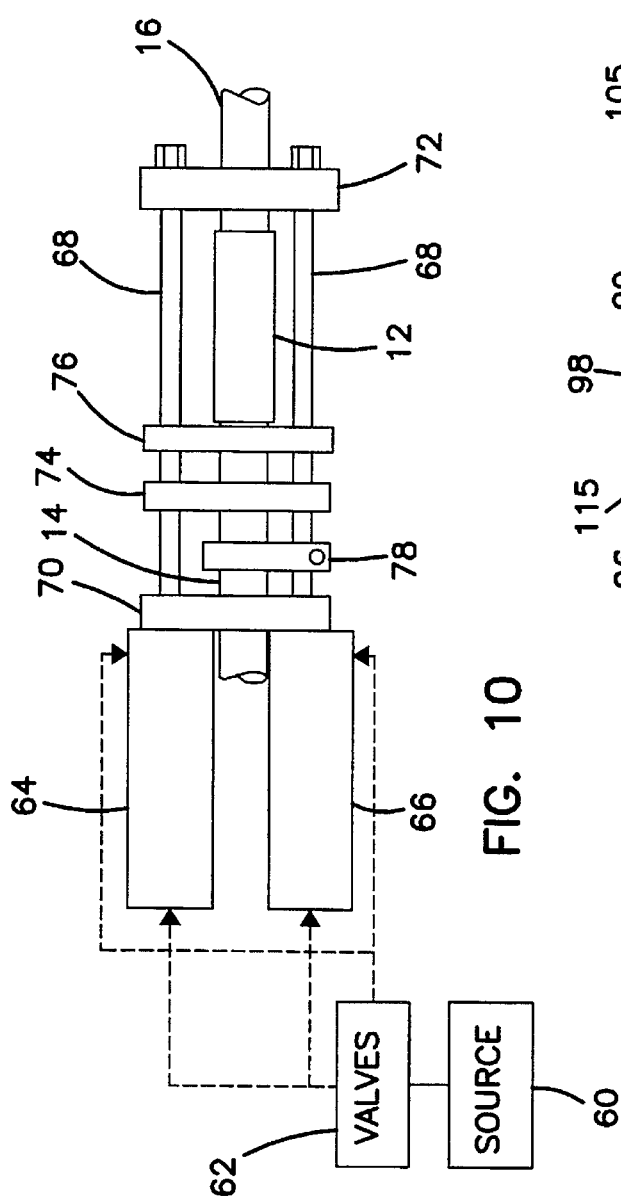
FIG. 10 is a generalized perspective view of a clamping system for coupling together sections in methods in accordance with the invention.

As shown in FIGS. 10 and 11, a suitable tool 58 for making the field connection utilizes air or hydraulic pressure from a source 60 controllable by valves 62, either manually or automatically. The valves 62 control the feed of pressurized air to one or the other of opposite ends of a pair of air cylinders 64, 66. Like piston shafts 68 from the cylinders 64, 66 pass through an opening in a first clamp 70 which secures the cylinder 64, 66 to the mill end pipe 14. The shafts 68 extend to and are engaged to a second clamp 72 which is secured to the field end pipe 16, on the opposite side of the coupling 12 from the mill end pipe 14. Between the two attached ends the piston rods 68 move freely through a guide clamp 74 and a third clamp 76 which is secured to the mill end pipe 14 adjacent the collar 12. A safety clamp 78 is disposed between the first clamp 70 and the guide clamp 74 to assure that the assembly does not come loose under pressure if an element fails.

When the tool 58 is installed in position as shown in FIGS. 10 and 11, the second clamp 72 is initially spaced far enough away from the adjacent end of the collar 12, to allow full insertion of the mill end pipe 16 into the collar 12. The piston shafts 68 are first driven such that the field end pipe 16 moves toward the collar 12. As the nose end of the field end pipe 16 engages the central seal ring, axial force is exerted until the center seal ring is fully compressed and the snap rings shift into the appropriate grooves. The valves 62 are then operated to reverse the direction of force from the air cylinders 64, 66 on the piston shafts 68 so that the second clamp 72 is biased away from the collar 12, tending to disengage the coupling if the connections have not been made properly. When a given pressure level is reached, it is known that the connection is secure and the tool can be removed.

This sequence of operations in the field requires only two or three minutes to provide assurance of a properly engaged end sealed connection which is a small fraction of the time required to effect a proper welded connection.

Figure 12:
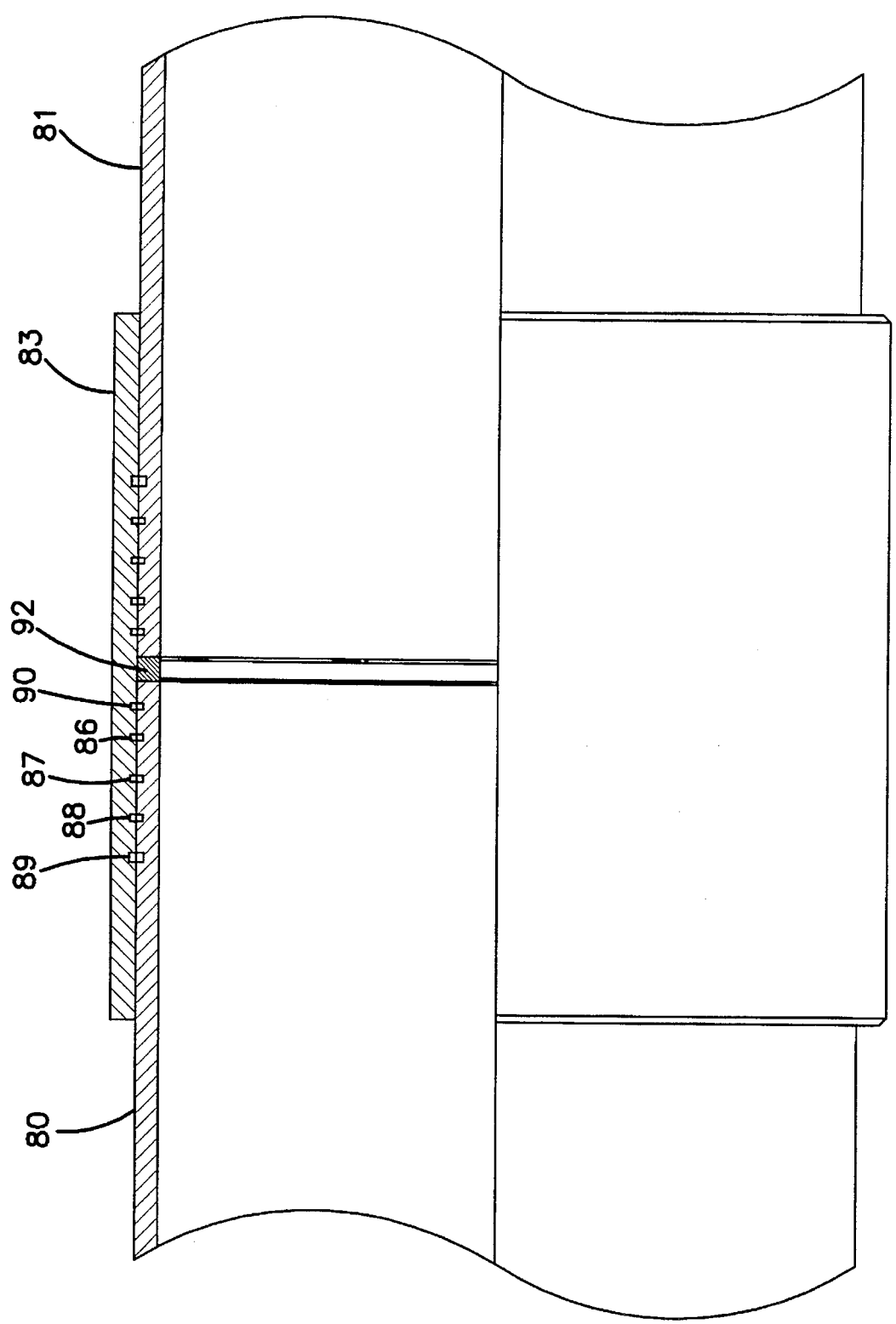
FIG. 12 is a side sectional view of a different example of a system in accordance with the invention for use with larger pipe.

While the example of FIGS. 1–2 represents a connection with a nominal size of 2⅜", the example of FIG. 12 has pins of 12¾" nominal diameter. The pins 80, 81 have a wall thickness of 0.375", and the collar 83 is of 12¾" inch nominal length. In this example, there is a progression of four snap rings 86, 87, 88 and 89 and one O-ring 90, on each side, about a center seal ring 92. The snap rings 86 to 89, with respect to the collar 83, increase in axial dimension in the direction from the center toward the associated end of the collar 83. The greater the number of snap rings used, the greater the load distribution, and the less the reduction in wall thickness at the grooves. Although only a single O-ring 90 is shown on each side, it is evident that two or more O-ring seals may be used if desired.

Figure 13:
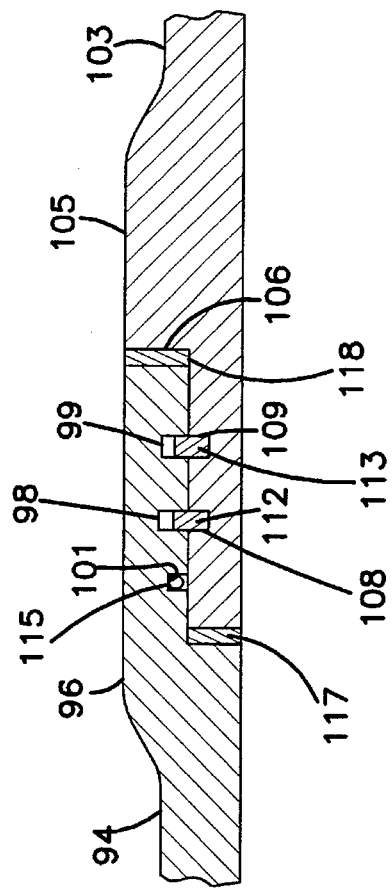
FIG. 13 is a side sectional view of a fragment of an upset pipe, collarless connection.

The example of FIG. 13 shows how the open loop snap rings may be employed with upset pipe, without a collar. Here a first pipe 94 serving as the female member has an upset section 96, including internal grooves 98, 99 of different axial lengths, and an O-ring groove 101 adjacent an inner shoulder 102 in the upset section 96. A male second pipe 103 has an upset section 105 having an outer shoulder 106, and grooves 108, 109 corresponding to those in the other pipe 94 end. Suitably sized snap rings 112, 113 and an O-ring 115 are mounted in the grooves provided as previously described. End seals 117, 118 are disposed between the nose ends of the male pipe section 103 and the associated shoulder 102 of the female pipe section 94, and between the nose end of the section 94 and the shoulder 106 on the male pipe section 103.

The connection of FIG. 13 is made by inserting the first pipe section 103 as a male member into the second female pipe section 94, in which the O-ring 115 and snap rings 112, 113 have been inserted with the end seals 117, 118 in place. When in position, the snap rings 112, 113 lock into position in the male pipe section 103 and the seals and O-ring are compressed to provide the characteristics previously described.

It will be evident to those skilled in the art that systems in accordance with the invention can be used with pipe having uncoated or unlined inner diameters with substantial benefit. This ability to make pipe interconnections without the use of costly field welders and their associated machines, and other expensive equipment, while also reducing the need for skilled staff, can appreciably lower the costs of a pipeline system.

The invention as described above and illustrated in the drawings incorporates various forms and modifications in accordance with the invention, but it will be appreciated that the invention is not limited thereto but encompasses all modifications and exemplifications within the scope of the appended claims.

I claim:

1. A quick fitting interconnection system comprising:

a pipe collar of parent unstressed metal and having a pair of interior circumferential wall sections each having at least two circumferential rectangular grooves of predetermined axial dimension therein on each side of an axially central region, the grooves on each side decreasing in axial length relative to each other in the direction from the collar end to the central region;

a pair of pipes to be interconnected, the pipes including outer diameter surface sections for mating into the opposite interior wall sections of the collar, and having of least two circumferential rectangular grooves on the surface sections matching the collar grooves in axial length and position, the grooves being disposed in facing relation when the pipes are inserted to selected nominal positions into the collar wall sections; and open loop snap rings disposed in the matching opposed grooves of the collar and fully inserted pipes, the snap rings being of smaller radial dimension than the radial gap between the groove roots of the opposed grooves, the axial lengths of the snap rings increasing in axial length correspondingly to the grooves such that when installed in the collar grooves, they move across smaller grooves in the pipe until seating in the appropriate grooves in the pipe when the pipe is inserted.

2. An interconnection system as set forth in claim 1 above, wherein the rings have outer diameters and radial width sufficiently smaller than the groove root diameters and depths within the collar to expand thereinto when expanded by the outer diameter surface sections of the inserted pipe, and thereafter contracting into the proper associated groove of the pipe to define a shear ring spanning at least part of the side walls of both facing grooves to limit axial displacement of the pipe relative to the collar.

3. An interconnection system as set forth in claim 2 above, wherein the snap rings are of smaller axial length than the grooves in which they fit, and are curved with respect to a circumference about the pipe.

4. An interconnection system as set forth in claim 3 above, wherein the snap rings have a helical configuration with a pitch such that they contact both side walls of the grooves into which they fit and a strength in shear exceeding the tensile yield strength of the pipes in the system.

5. An interconnection system as set forth in claim 1 above, wherein the system further includes a central seal ring disposed between the pipe ends in the central region of the collar, the ends of the fully inserted pipes being spaced apart by a predetermined distance and the central seal ring having an axial length between the pipe ends such that the central seal ring is compressed by the pipe ends when the snap rings are in position in the associated grooves.

6. An interconnection system as set forth in claim 5 above, wherein the pipes include interior coatings, and the central seal ring has an inner diameter flush with the coated inner diameters of the pipes, and wherein the system further includes O-ring means disposed circumferentially between each pipe and the collar in the region between the pipe end and the adjacent snap ring.

7. An interconnection system as set forth in claim 6 above, wherein the pipes each have a nose end, a side chamfer at the outer diameter side of the nose end, and a reduced outer diameter end section, and wherein the central seal ring includes a central body, end flanges mating with the reduced outer diameter sections on fully inserted pipes, and side walls mating with the side chamfers at the pipe ends.

8. An interconnection system as set forth in claim 1 above, wherein the pipes each have nose ends transverse to the central axis of the pipe and outer diameter chamfers positioned to engage within and cam apart the snap rings when the pipe is inserted in the collar.

9. An interconnection system as set forth in claim 1 above, wherein the system further includes a central seal ring disposed in the central region of the collar, the pipe ends being spaced apart when the pipe ends are fully inserted and the central seal ring being compressed between the pipe ends, O-ring means disposed circumferentially about each pipe within the collar in the region between the pipe end and the closest adjacent snap ring groove, and adhesive means disposed between the collar and each of the pipes.

10. A connection for pipe having male and female segments comprising:

means in the inner diameter of the female segment defining at least two circumferential grooves, the grooves each having a predetermined axial length and being rectangular in cross-section, the axial lengths of the grooves decreasing progressively from the open end of the female segment;

means in the outer diameter of the male segment defining at least two circumferential grooves having predetermined axial lengths matching the lengths of the grooves in the female segment and being positioned with like spacings, the grooves being rectangular in cross-section, the grooves of the male and female members being in facing relation when the male segment is inserted to a predetermined position within the female segment;

a number of snap ring means, each disposed in the facing grooves of the female and male segments, the snap ring means spanning at least a substantial portion of the depth of each associated groove and each having an axial length that is a substantial fraction of the axial length of the groove in which it is disposed, such as to limit axial displacements between the male and female segments; and seal means disposed between the female and male segments in the region of the end of the male segment.

11. A connection for pipe as set forth in claim 10 above, wherein the snap ring means comprise a number of open loop snap rings of high strength material having helical curvatures relative to the circumferential direction, each snap ring contacting both sides of the facing grooves in which it is disposed.

12. A connection for pipes as set forth in claim 10 above, wherein the connection is for use in a fluid transport system, the female segment comprising a collar and the male segments comprising tubing fitting within the collar from opposite ends toward a central region, and wherein said seal means further comprises a central seal ring in the central region of the collar sized to be compressed by the inserted ends of the tubing, the tubing including internal coating and the central seal ring having an inner central diameter flush with the inner diameter of the coated tubing, and O-ring seal means disposed between the central region and the closed adjacent snap ring of each tubing, and anaerobic adhesive means coupling the outer diameter of each tubing to the inner diameter of the collar.

13. A connection for pipes as set forth in claim 12 above, wherein the collar and each tubing segment include at least two grooves and matching snap rings on each axial side of the central region of the collar, the axial lengths of the grooves and snap rings varying in size to be progressively smaller moving inwardly from the ends of the collar, and the snap rings not being disengageable from the grooves to provide a permanent unidirectional coupling.

14. A connection as set forth in claim 10 above, wherein the female member and male member comprise upset pipe sections, the female member having an internal shoulder and the male member having a nose end adjacent the internal shoulder when the male member is fully inserted, and said seal means disposed between the internal shoulder of the female member and the nose end of the male member and compressed when the male member is fully inserted.

15. A connection as set forth in claim 14 above, wherein the connection further includes O-ring groove means disposed in the female member between the internal shoulder and the closest snap ring groove and the connection further includes O-ring means in the O-ring groove means engaging the outer diameter of the male member and anaerobic adhesive means engaging both the inner diameter of the female member and the outer diameter of the male member in the insertion region of the male member.

16. An upset pipe connection comprising:
   a female upset member having a substantially constant internal diameter overlap section terminating in an internal shoulder, the female member having at least two circumferential ring grooves of predetermined axial length, the ring grooves decreasing progressively in axial length in the overlap section from the end to the interior of the overlap section, and a circumferential O-ring groove between the closest ring groove to the internal shoulder;
   a male upset member having a substantially constant external diameter overlap section including at least two circumferential ring grooves matching and opposing those of the female member when the overlap sections are aligned;
   at least two snap ring means disposed in the aligned grooves of both the female and male members for limiting relative axial movement of the members, the snap ring means having axial lengths fitting only within groove sizes equal to or greater than those into which they are to be disposed; and
   seal means disposed between the male member and the internal shoulder of the female member.

17. A connection as set forth in claim 16 above, wherein the male member has a nose end insertable into the overlap section of the female member and including an outer diameter edge chamfer acting as a cam insertable within snap rings for expanding the same, the seal means being disposed between the nose end of the male member and the internal shoulder of the female member when the male member is in position, wherein the overlap section includes at least two grooves and matching snap ring means of different axial lengths and the connection further including O-ring means in the overlap section.

18. A snap together connection for oil field tubular goods comprising:
   a collar with at least two internal circumferential grooves about a central axis on at least two inner surfaces along opposite axial sides of the center, wherein the relative axial lengths of the grooves decrease in the direction axially from each end of the collar toward the center region;
   a number of snap rings each disposed within a different one of the circumferential grooves in the collar and radially sized such that each ring can expand radially within its associated groove;
   an internal seal disposed at the center of the collar;
   at least one circumferential O-ring groove disposed in the inner surface of the collar between the internal seal and the closest adjacent circumferential groove;
   an O-ring disposed in each of the O-ring grooves; and
   a pair of pipes within the collar at each end, each pipe having an end shaped for engaging the internal seal and circumferential grooves sized and positioned to accept the snap rings, the pipe ends including camming surfaces for expanding the snap rings to facilitate entry of the pipes into the collars.

19. A unidirectional snap together connection for tubular goods comprising:
   first and second tube sections, each having a number of circumferential grooves of progressively larger axial length from the tube section end that is to be joined, wherein snap connector rings of different axial size may be received within the grooves;
   a collar having sets of internal grooves on opposite sides of a central region that align with and match the tube section grooves when the tube sections are inserted to predetermined distances within the collar;
   a number of compressible snap connector rings disposed within the collar grooves, the snap connector rings varying in axial length to fit only in grooves of selected axial length; and
   a center seal disposed within the collar between the ends of the tube sections and in contact therewith.

20. A quick fitting pipe interconnection system comprising:
   a pipe collar of parent unstressed metal and having a constant diameter interior wall having at least two circumferential grooves of predetermined axial dimensions therein on each side of an axially central region, the grooves on each side having decreasing axial dimensions from the adjacent collar end;
   a pair of pipes to be interconnected, the pipes including constant outer diameter sections for mating with a sliding fit into the interior wall of the collar and end means defining cam surfaces, and each pipe also having at least two circumferential grooves matching the collar grooves when the pipes are inserted to selected nominal positions into the collar; and
   open loop snap rings of smaller radial dimension than the radial gap between the opposing groove roots disposed within the grooves on each side of the central region, wherein the snap rings are of slightly smaller axial length than the grooves in which they fit, and are helically curved with respect to the loop plane with a pitch such that they contact both sides of the grooves.

21. An interconnection system as set forth in claim 20 above, wherein the rings have outer diameters and radial widths sufficiently smaller than the groove root diameters and depths to expand thereinto when expanded by the cam surfaces of the inserted pipe, thereafter contracting into the groove of the pipe to provide a shear ring against axial displacement of the pipe relative to the collar.

22. An interconnection system as set forth in claim 21 above, wherein the grooves are axially displaced on each side of the collar with the axial lengths of the grooves decreasing in the direction from the end to the center of the collar, and the pipe ends having like grooves positioned in opposing relation, and wherein the snap rings are sized to bypass all grooves of smaller dimension.

23. A coupling system for connection of pipes comprising:
- a pair of tubular pipes, each having at least a terminal section of substantially constant outer diameter, a chamfered nose end at the outer diameter and a number of circumferential grooves therein;
- a collar having a substantially constant inner diameter mating with a sliding fit over the tubular pipes and a number of circumferential grooves therein positioned to oppose the grooves in the pipes when the pipes are inserted to nominal positions therein, at least two of the grooves on each axial side of the center of the collar being of different axial lengths, with the longer length being closer to the end of the collar;
- a central resilient seal ring compressed between the pipe nose ends and sized to fill the space therebetween when the pipes are in their nominal positions;
- elastomeric seal rings disposed in at least one of the grooves in the collar on each side of the central seal ring; and
- spring snap rings mounted in the grooves of different axial lengths on each side of the central seal ring on the collar and configured to expand over the chamfered nose of a pipe end within the opposed circumferential grooves in the collar, bypassing the circumferential grooves of shorter axial length until the appropriate length groove in the pipe is reached.

* * * * *

UNITED STATES PATENT AND TRADEMARK OFFICE
CERTIFICATE OF CORRECTION

PATENT NO. : 5,584,512
DATED : December 17, 1996
INVENTOR(S) : K. Carstensen

It is certified that error appears in the above-identified patent and that said Letters Patent is hereby corrected as shown below:

IDS Page, Column 56 – Delete "7/1992 Tauscher et al." and replace with —7/1989 Tauscher et al.—

Column 3, Line 53 – The wording "In the" should read —in the—.

Col. 3, Line 61 – Delete the word "maybe" and replace with —may be—.

Col. 4, Line 23 – The numeral "0.002,"" should read —0.002",—

Col. 4, Line 46 – The numeral "±0.002,"" should read —±0.002",—

Col. 4, Line 53 – The numeral "–0/000,"" should read —0.000",—

Col. 5, Line 11 – The numeral "–0.005."" should read —0.005".—

Col. 6, Line 1 – Insert —, — before ""PEEK","

Col. 8, Line 28 – Delete the word "inch" after "12 3/4".

Col. 9, Line 36 – Delete the word "width" and replace with —widths—.

– note: A=Amendment

Col. 10, Line 59 – Delete the word "further" after —means—.

Signed and Sealed this

Eighth Day of September, 1998

Attest:

BRUCE LEHMAN

*Attesting Officer*  *Commissioner of Patents and Trademarks*